Dec. 30, 1969 A. THIBAULT 3,486,599
FRUIT PICKER
Filed Feb. 23, 1967 3 Sheets-Sheet 1
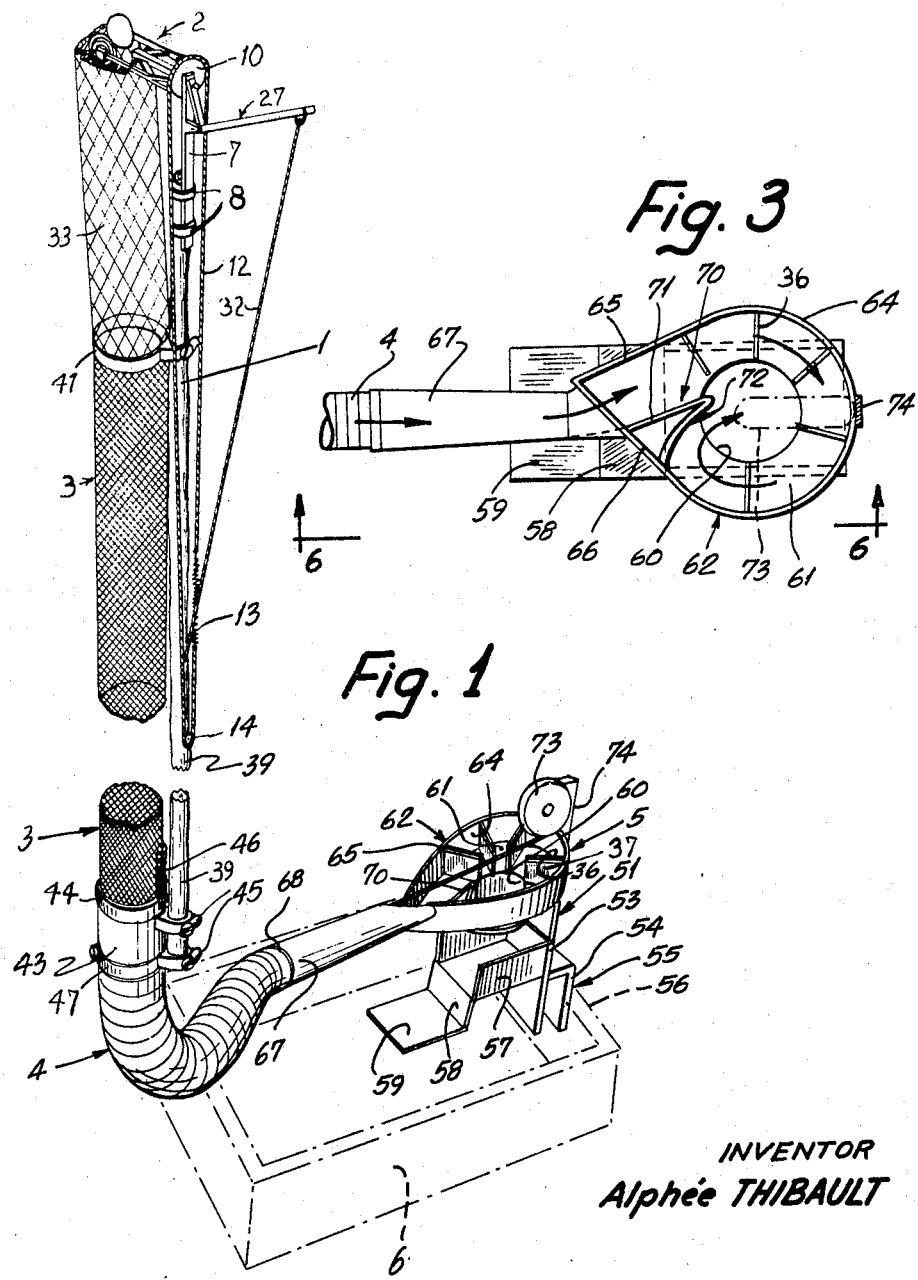
INVENTOR
Alphée THIBAULT

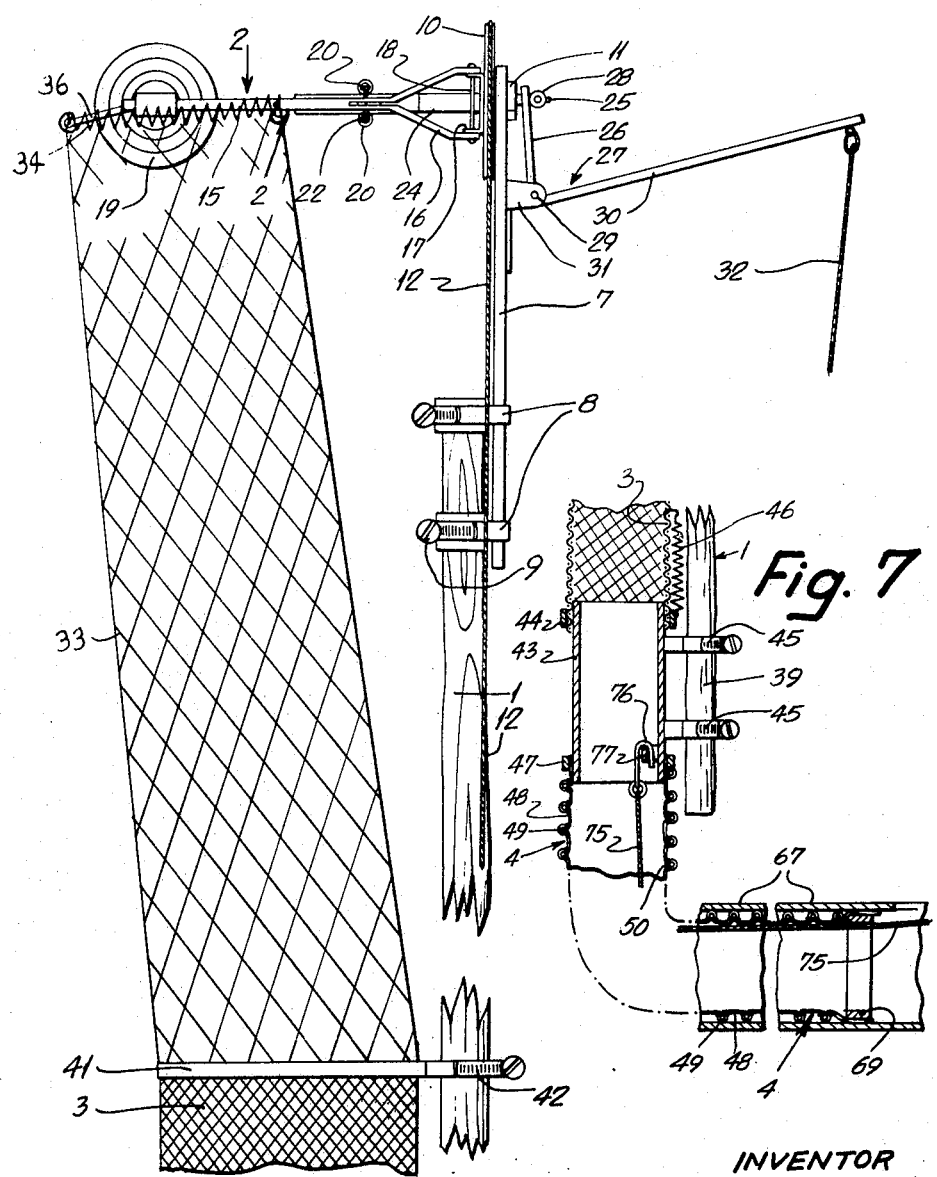

Dec. 30, 1969     A. THIBAULT     3,486,599
FRUIT PICKER
Filed Feb. 23, 1967     3 Sheets-Sheet 3

INVENTOR
Alphée THIBAULT

United States Patent Office 3,486,599
Patented Dec. 30, 1969

3,486,599
FRUIT PICKER
Alphée Thibault, 4347 Charlemagne St.,
Montreal 36, Quebec, Canada
Filed Feb. 23, 1967, Ser. No. 618,088
Int. Cl. A01g *19/08*
U.S. Cl. 193—7                    9 Claims

ABSTRACT OF THE DISCLOSURE

A manually-operated fruit picker for collecting fruits from orchard trees while standing on the ground, including a long handle carrying a pair of opposite fruit grasping members adapted to grasp a fruit under the action of remotely-operating means and means to rotate said grasping members to bend the fruit stem and operated by second remote controlled means.

The fruit picker further includes means to collect fruits, guide and discharge the same into an open top container without bruising them.

---

The present invention relates to a fruit picker for collecting fruits from trees in orchards, enabling the operator to detach the fruit from a tree while standing on the ground, thereby eliminating the necessity of climbing a ladder, or the like, to pick the fruit by hand.

The general object of the present invention resides in the provision of a fruit picker of the character described, having a tool at the end of a long, light-weight handle, which is remotely controlled and operated to grasp a fruit and detach the same from a tree branch without in any way bruising the fruit and without having to cut the fruit stem.

Another object of the present invention resides in the provision of a fruit picker of the character described, in which the fruit is detached from the tree branch in a two-step operation, the first step comprising positively grasping the fruit by means of two opposite fruit grasping members and then rotating the fruit with respect to the tree branch by means of said grasping members, to bend the fruit stem, thereby enabling easy detachment of the same from the tree branch.

Another object of the present invention resides in the provision of a fruit picker of the character described, further provided with means to direct the fruit released by the fruit grasping members downwardly along the handle and into a collecting box, all in a gentle manner, in order to positively avoid any bruises to the fruit.

Another object of the invention resides in the provision of a fruit picker of the character described, which is of light-weight construction and thereby easily manipulated in order to easily obtain access to fruits between branches and at a relatively high level in the orchard tree.

Another object of the present invention resides in the provision of a fruit picker of the character described, in which the means for guiding and collecting the fruits released from the grasping members are extensible to a considerable extent, so that the operator will have a considerable reach from the box containing the fruits, whereby he does not have to move said box often for picking fruits from an entire tree.

Another object of the present invention resides in the provision of a fruit picker of the character described, in which the fruit guiding and collecting device is adapted to be mounted on a conventional box as used in orchards and which enables the operator to move all around the box and still guide and discharge fruits into the same.

The foregoing and other objects of the present invention will become more apparent during the following disclosure and by referring to the drawings, in which:

FIGURE 1 is an exploded perspective view of the fruit picking system in accordance with the invention;

FIGURE 2 is a partial side elevation of the operative end of the fruit picking system showing the tool for grasping and detaching the fruits and the mouth portion of the fruit guiding tube;

FIGURE 3 is a partial top plan view showing the fruit discharging device for discharging the fruit into a conventional box, said view being taken along line 3—3 of FIGURE 6;

FIGURE 7 is a broken-away partial longitudinal section of the fruit guiding system.

Figure 4:
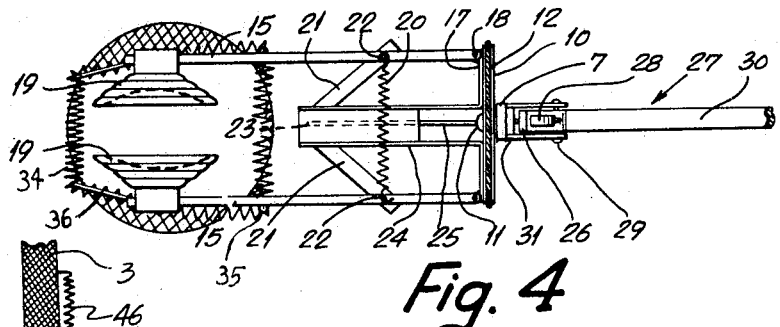
FIGURE 4 is a top plan view of the fruit grasping tool in closed position.
Figure 6:
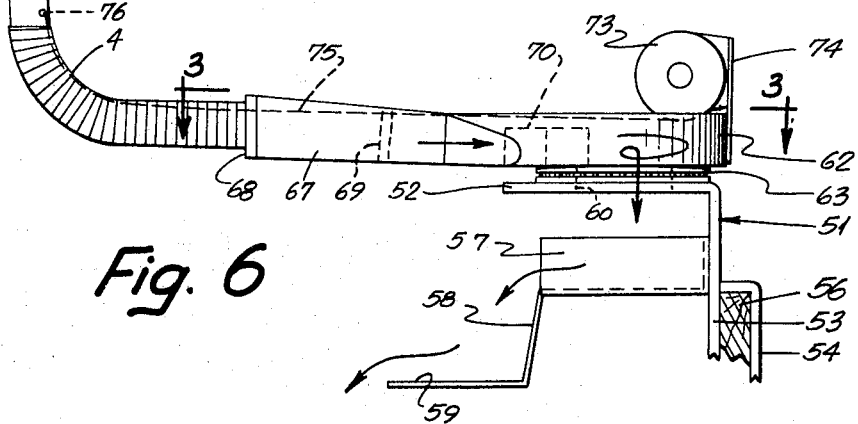
FIGURE 6 is a partial side elevation of the fruit guiding and fruit discharging system, taken along line 6—6 of FIGURE 3.

Referring now more particularly to the drawings in which like reference characters indicate like elements throughout, the fruit picking system in accordance with the invention comprises essentially, as shown in FIGURE 1, a long light-weight handle 1 adapted to be manipulated by an operator, a fruit grasping and detaching tool, generally indicated at 2, mounted at the outer end of handle 1, a fruit collecting and guiding tube 3 extending alongside and secured to handle 1, an extensible tube 4 communicating with tube 3 at one end and with a fruit discharging system 5 at the other end, said fruit discharging system 5 being adapted to be removably secured to an open top box 6, or similar conventional container for fruits.

Handle 1 is generally straight and of light-weight construction and may have any suitable length. It is preferably made of bamboo. A straight metal rod 7 is rigidly secured to the outer end of handle 1 by means of a pair of spaced collars 8 surrounding the handle 1 and rod 7, said collars being provided with tightening devices 9, of known construction.

Rod 7 extends in the prolongation of handle 1, and its outer end carries a grooved wheel 10, which is freely rotatable about an axis perpendicular to rod 7 and, consequently, to handle 1. More specifically, a hollow shaft 11 is rigidly secured to the outer end of rod 7 and wheel 10 is freely rotatable on said shaft.

A flexible rope 12 is inserted in the groove of wheel 10 and the two strands of rope 12 extend along the handle 1 and their ends are interconnected by means of a tension spring 13. One strand of rope 12 is trained on an end pulley 14 secured to the end zone of handle 1 to be grasped by the operator.

Spring 13 maintains the rope 12 in taut condition and in frictional engagement with wheel 10 so that the latter will be easily rotated by operation of one or the other strands of rope 12 by the operator.

Figure 5:
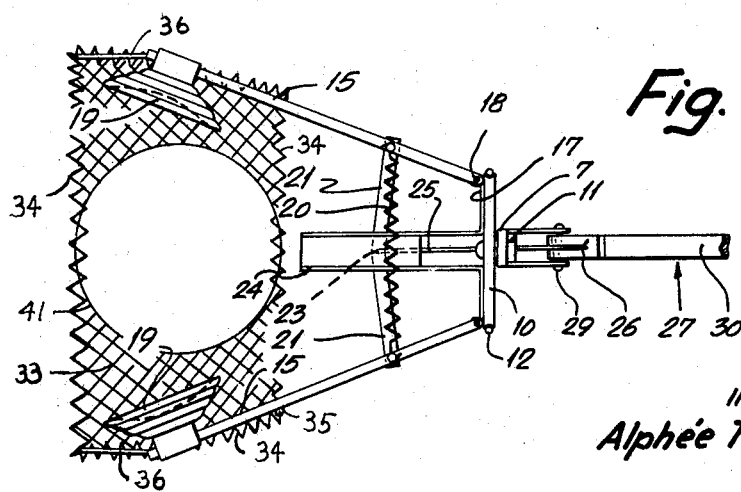
FIGURE 5 is a view similar to that of FIGURE 4 showing the grasping members in open position.

A pair of rigid lever arms 15 are disposed side by side and extend generally at right angles to the plane containing wheel 10, that is to the plane of rotation of wheel 10. The lever arms 15 have forked inner ends 16 which are pivotally connected to a bracket 17 by means of a pivot pin 18, the bracket 17 being secured to the free face of wheel 10. The two pins 18, one for each lever arm 15, are parallel to each other so that the two lever arms 15 can pivot with respect to wheel 10 towards and away from each other, as shown in FIGURES 3 and 5. The two pins 18 are equidistant from and are disposed on each side of shaft 11.

The outer end of each lever arm 15 carries a fruit grasping member 19, each having a cup-shape with its concave surface facing the concave surface of the other member 19 of the pair. These members 19 are preferably made of flexible resilient material, such as rubber or the like. A pair of tension springs 20 are attached at their ends to the two lever arms 15 and extend therebetween and urge the same into closed position, that is the position shown in FIGURE 4. These springs 20 are attached to the lever arms 15 intermediate the ends of the latter.

A toggle lever system 21 is pivotally connected to the lever arms 15 at the outer ends of the levers of the toggle system, by means of pins 22 serving also as attachment for the springs 20. The inner ends of the pair of toggle levers 21 are interconnected at 23 inside a guide block 24 rigidly secured to the outer face of wheel 10 and preferably integral with brackets 17 serving to support the pivot pins 18 of the lever arms 15.

Guide block 24 is provided with a slot through which the inner ends of the toggle levers 21 extend and are guided.

In the closed position of the lever arms 15, the two toggle levers 21 make a pronounced acute angle relative to each other and converge in the direction of grasping members 19. In the open position of the lever arms, the toggle levers 21 still make a slight angle between each other and are still converging towards the grasping members 19. The toggle levers 21 therefore serve to open the two lever arms 15 simultaneously and at the same angle and yet, when released, they allow the coil springs 20 to close the two lever arms 15.

A draw wire 25 is secured at its outer end to the pivot 23 between the two toggle levers 21, extend through guide block 24, through the hollow shaft 11 of wheel 10 and through a hole made in a leg 26 of an L-shaped lever 27. Draw wire 25 has a head 28 secured to its outer end and serving as an abutment for lever 27.

L-shaped lever 27 is disposed in a plane passing through rod 7 and is pivoted at 29 for movement in said plane. The pivot 29 is made at the junction of leg 26 with leg 30 and is carried by a bracket 31 secured to rod 7. Leg 30 extends outwardly from rod 7 and makes a slightly acute angle with leg 26.

A draw rope 32 is attached at one end to the outer free end of leg 30 of lever 27, while the other end of the draw rope 32 is attached to handle 1 in the zone of said handle adapted to be grasped by the operator's hands. Pulling of the draw rope 32 causes axial movement of draw wire 25 in a direction away from grasping members 19 and said draw wire in turn causes a straightening movement of toggle levers 21, which in turn cause opening of lever arms 15. Upon release of the draw rope, the lever arms automatically close under action of springs 20. The opening and closing movement of the lever arms 15 can be accomplished independently of the rotational position of wheel 10, because draw wire 25 is co-axial with the wheel 10 and is free of the same.

Wheel 10, and consequently the lever arm assembly, may be rotated about shaft 11 to any desired rotational angle by means of rope 12, and when said rope is released, the assembly will stay in the intended adjusted rotational angle due to the balanced construction of tool 2 about the axis of wheel 10 and due to a certain friction to rotation in the system wheel 10, rope 12, pulley 14.

To pick a fruit in a tree, the handle 1 is grasped while pulling draw rope 32 to open the grasping members 19 and the latter are positioned on each side of the fruit and the draw rope is released; the grasping members 19 automatically close in and grasp the fruit under the action of springs 20 from opposite sides of the fruit. Then one strand of rope 12 is pulled to bodily rotate the grasping members 19 about shaft 11, thereby rotating the fruit and causing bending and release of the fruit stem from the tree branch.

Normally, about one quarter turn of the wheel 10 will be sufficient to cause detachment of the fruit stem; but, if necessary, the wheel 10 can be rotated to any angle to cause the detachment of the fruit. The fruit is thereafter released by opening movement of the grasping members 19 upon pulling rope 32.

It will be noted that the grasping members 19 can in no way bruise the fruit, because they are made of flexible relatively soft material, such as rubber. Also, the closing force applied by members 19 on the fruit is solely provided by springs 20 and is independent of the operator. This is important for such fruits as apples, peaches, pears and the like.

Rotational movement of the members 19 about shaft 11 causes a detachment of the fruit stem in a manner similar to the manner used by fruit pickers upon manual detachment of the fruit.

It is noted that the rotational angle of the wheel 10 may be adjusted prior to picking a fruit in accordance with the vertical inclination made by handle 1 while reaching for said fruit so as to have the grasping members engage both sides of the fruit with said grasping members lying in substantially vertical planes. The inclination of the handle will, naturally, depend on the height of the fruit to be picked and the path to be followed to reach the fruit while clearing the tree branches and similar obstructions.

Once the fruit is released from the grasping members 19, it falls under gravity into tube 3. Tube 3 is made of flexible netting and comprises a tubular mouth portion 33, into which the grasping members 19 are partially inserted. The edge of mouth portion 33 is attached to an extensible elastic member, such as a coil spring 34. This spring is attached to arms 15 by studs 35, or the like, located inwardly of grasping members 19, and to the outer ends of small rods 36 which are rigidly secured to arms 15. Opening movement of arms 15 causes increase in the size of the mouth of net tube 3 against action of spring 34 which reduces the mouth size to a minimum when arms 15 are in closed position. Thus, the net tube 3, although it always surrounds the grasping members 19 and positively catches any fruit released by the grasping members 19, takes up a minimum cross-sectional area when inactive to allow tool 2 to easily reach a fruit among tree branches. The lower portion of the mouth portion 33 is attached to a collar 41 surrounding the same, which in turn is secured to handle 1 by means of a conventional clamping collar 42.

Collar 41 also maintains the netting in tubular shape and in taut condition against the action of spring 34. The remaining part of tube 3 is also made of flexible netting and is of substantially uniform diameter and extends alongside handle 1 and its lower end is fitted over a short cylindrical metal tube 43 and is secured to the latter by means of a clamping collar 44.

Metal tube 43 is rigidly secured to the handle 1 and, more particularly, to the lower end portion 39 thereof by means of clamping collars 45. In order to maintain the portion of flexible tube 3 between tube 43 and retaining collar 41 in substantially taut condition, a tension spring 46 is attached to the collar 44 or tube 43 at one end and to flexible tube 3 at the other end.

Extensible tube 4 is detachably connected to the outer end of metal tube 43 by means of a collar 47, or the like, which tightly fits over the metal tube 3 but is removable therefrom. Extensible tube 4 consists of fabric or netting 48 associated with a resilient helical wire 49. The netting 48 surrounds the wire 49 and is stitched at 50 inwardly of wire 49 to define a helically extending pouch on the exterior of the tubular netting 48 for the wire 49.

With this arrangement, a very light weight extensible tube 4 is obtained, which may be, for instance, not more than 1' when in collapsed condition and which may extend to 15' when in extended condition.

The other end of extensible tube 4 is connected to the fruit discharging system 5. Said system 5 comprises a rigid shaped bracket 51, made of a metal plate defining a horizontal leg 52 and a vertical leg 53.

The lower portion of vertical leg 53 defines a clamp 55 with an L-shaped member 54 secured thereto, the clamp 55 having the shape of a downwardly opening U for tightly receiving and be supported by a side wall 56 of a conventional standard wood box 6. Vertical leg 53 also supports a somewhat rectangular tray 57 which is horizontally disposed and is open at one end, said open end being extended by a downwardly inclined plate 58 terminated by a horizontal foot pad 59, which in the secured position of the discharging system on the box 6 extends slightly above the bottom of the box 6.

The inside surface of tray 57 and the top surfaces of chute 58 and foot pad 59 are preferably lined with a cushion material, such as sponge rubber or the like.

Horizontal leg 52 of bracket 51 is provided with a central large diameter hole disposed vertically opposite the center of tray 56 and receiving a cylindrical skirt 60, of slightly smaller diameter, and depending from and surrounding a hole in the bottom 61 of a receiver member 62 rotatably mounted on bracket 51.

A ball bearing system 63, of large diameter, supports the receiver member 62 on the horizontal leg 52, the two races of the ball bearing system 63 being secured to the underside of bottom 51 and to the top of horizontal leg 52 respectively. The ball bearing system is co-axial with and surrounds the skirt 60 of bottom 61. Thus, receiver member 62 is freely rotatable with respect to bracket 51 in a horizontal plane.

Receiver member 62 has a side wall defining a partly circular portion 64 and converging straight portions 65 and 66. The side wall is upstanding from the perimeter of the bottom 61. Bottom 61 is slightly radially inwardly downwardly inclined from the side wall to skirt 60. A rigid tube 67 is secured to straight side wall 66 near the apex between the two side wall portions 65 and 66 and is in communication with the inside of the receiver member 62.

Rigid tube 67 extends substantially in a horizontal plane and is slightly flared towards its free inlet end 68. The discharge end of the extensible tube 4 opposite to the end secured to metal tube 43, is clamped well inside rigid flaring tube 67 by means of a clamping collar 69, which is inserted within extensible tube 4 and clamps the same against the inside surface of flaring tube 67, as shown in FIGURE 7. Thus, when the extensible tube 4 is disconnected from metal tube 43, it can all be nested within flaring tube 67 in the collapsed condition of tube 4. As shown in FIGURE 3, the entrance portion of rigid tube 67 within the receiver member 62 makes a slight angle in a horizontal plan with respect to the remaining portion of the tube 67, so as to be generally parallel to side wall portion 65, with which one side of said entrance portion of tube 67 is substantially aligned.

A V-shaped baffle element 70 has its side 71 aligned with the opposite side of the entrance of rigid tube 67. Side 71 is substantially straight and converges with a curved side 72, the opposite end of which substantially merges with the circular wall portion 64. The apex of the V-shaped baffle 70 protrudes slightly over the centre hole made in bottom 61 of receiver member 62, when seen in top plan view.

Spaced rigid bars 36 are secured to walls 64, 65 of receiver 62 and extend towards the center hole in bottom 61 being spaced above said hole. Each bar 36 supports a depending flexible flap 37, of rubber for example, which extends close to bottom 61.

A reel 73 is mounted over receiver member 62, the housing of said reel being secured to the receiver member by a bracket 74. The reel 73 is spring-urged so that the rope 75 secured at one end to said reel, tends to wind itself on the reel.

The rope 75 extends through rigid tube 67 and inside extensible tube 4 and is provided at its free end with a hook 76 which is adapted to be removably attached to an eye bracket 77 secured to the inside of metal tube 43 attached to handle 1. Thus, rope 75 is adapted to extend throughout the length of tube 4.

The system in accordance with the present invention is used as follows:

Box 6 is preferably disposed under an orchard tree from which the fruits are to be picked. The fruit discharging system 5 is removably secured to the box 6 by fitting the U-bracket 55 on a side wall 56 of the box. Hook 76 of rope 75, which is normally threaded through rigid tube 67 and through the collapsed extensible tube 4 and hooked onto the free end 68 of tube 67, is pulled against the spring of reel 73 and attached to eye bracket 77 of metal tube 43 attached to handle 1. Then the extensible tube 4, which is normally entirely nested in tube 67, is pulled out from said tube 67 and attached to handle metal tube 43 by means of collar 44.

The apparatus is now ready for use. The operator grasps the handle 1 more or less near the end 39 of said handle, depending on the height of the fruit to be picked, and the tool 2 is operated by ropes 12 and 32 in the manner previously described. The fruit released by the grasping members 19 moves under gravity through flexible tube 3, extensible tube 4, rigid tube 67 from which they tend to rotate along the curved side wall portion 64 of receiver member 62 while being slowed down by passing under the successive flaps 37 and are finally deflected by the curved baffle portion 72 to enter the skirt 60 of the bottom 61 of receiver member 62. They drop onto tray 57, then along plate 58 and foot pad 59 to reach the bottom of the box. The circular path made by the fruits around the receiver member 62 and rubber flaps 37 serve to decelerate the same before dropping onto the tray. Preferably, the entire inner surface of the receiver member 52 is lined with a cushion material, such as foam rubber and the like. Subsequent fruits being picked are discharged on top of the fruits already within the box. When a box is nearly full, it is easy to remove the entire fruit discharging system 5 and replace the same on an empty box. Because the receiver member 62 is completely rotatable about the bracket 51, it is easy for the operator to reach fruits all around the box 6. Also, the extensible tube portion 4 enables the operator to reach a fruit in the tree at a substantial distance from box 6, both horizontally and vertically, so that an entire tree may be done without displacing box 6 more than a few times.

The rope 75 prevents any sagging of the extensible tube 4 between metal tube 43 and rigid tube 67 in all positions of the handle wherein the metal tube 43 is at a higher level than the receiver system 5. Thus, there is no danger of fruits collecting within the extensible tube 4. Yet the rope 75 is subjected to only a slight pull from spring reel 73, so that there is no undue pulling on the handle 1 effected by rope 75. For picking low lying fruits, the operator can pick the fruits by hand and insert them into the open end of the extensible tube 4 without using handle 1 and its assembly.

What I claim is:

1. Means to collect, guide and discharge fruits into an open top container, comprising a bracket adapted to be removably secured to an open top container, a dish-shaped collector member carried by said bracket and having a bottom wall provided with a discharge hole at the center thereof, adapted to be disposed over said container, and a curved side wall outwardly spaced from said hole, a rigid tube communicating with said collector member along a tangent of said side wall, a baffle member secured to the opposite end of said side wall and extending radially inwardly over said hole, an extensible tube having one end secured to said rigid tube, whereby fruits moving along said extensible tube by gravity and discharged into said collector member, will tend to travel in a curved path along said bottom and against said circular side wall and eventually be deflected by said baffle member into said discharge hole.

2. Means as claimed in claim 1, wherein said dish-shaped collector member is rotatably mounted on said bracket for rotational movement in a substantially horizontal plane.

3. Means as claimed in claim 1, wherein the end of said extensible tube secured to said rigid tube, is disposed within said rigid tube in a zone longitudinally spaced from the outer end of said rigid tube, whereby said extensible tube is nested within said rigid tube in the collapsed condition of said extensible tube.

4. Means as claimed in claim 2, wherein the end of said extensible tube secured to said rigid tube, is disposed within said rigid tube in a zone longitudinally spaced from the outer end of said rigid tube, whereby said extensible tube is nested within said rigid tube in the collapsed condition of said extensible tube.

5. Means as claimed in claim 1, further including spaced flexible flaps carried by said side wall and extending close to said bottom wall in the path of fruits moving along said bottom wall, to decelerate said fruits.

6. Means as claimed in claim 2, further including spaced flexible flaps carried by said side wall and extending close to said bottom wall in the path of fruits moving along said bottom wall, to decelerate said fruits.

7. Means as claimed in claim 4, further including spaced flexible flaps carried by said side wall and extending close to said bottom wall in the path of fruits moving along said bottom wall, to decelerate said fruits.

8. Means as claimed in claim 1, further including a spring-urged reel mounted on said collector member, a rope wound on said reel and urged into completely wound position on said reel, a hook attached to the free end of said rope, said rope adapted to extend through said rigid tube and through said extensible tube and to be removably attached to the free end of said extensible tube, to prevent sagging of the latter.

9. Means as claimed in claim 1, wherein said extensible tube comprises a flexible tubular member, a helically extending pouch on the exterior of said tubular member and a resilient helical wire extending within said pouch.

References Cited

UNITED STATES PATENTS

| | | | |
|---|---|---|---|
| 1,094,263 | 4/1914 | Stevens | 193—7 X |
| 3,115,960 | 12/1963 | Ott | 193—7 |
| 3,182,827 | 5/1965 | Frost | 193—7 |

ANDRES H. NIELSEN, Primary Examiner